Sept. 4, 1928.
F. BISZANTZ
DUMPING BODY
Filed Oct. 18, 1927      2 Sheets-Sheet 1
1,682,882
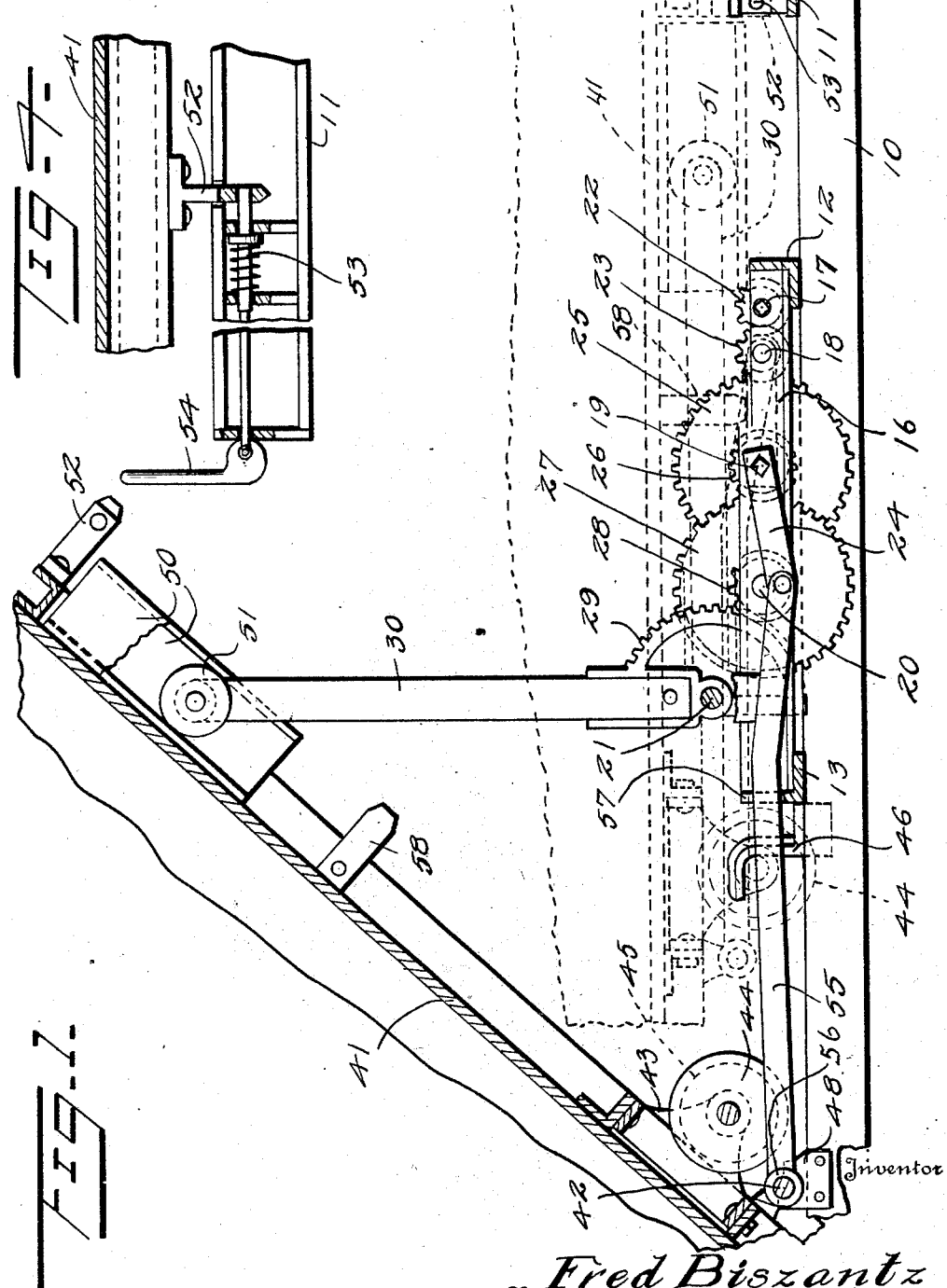
Inventor
Fred Biszantz
By Frederick S. Hill
Attorney Sept. 4, 1928.  
F. BISZANTZ  
1,682,882  
DUMPING BODY  
Filed Oct. 18, 1927    2 Sheets-Sheet 2
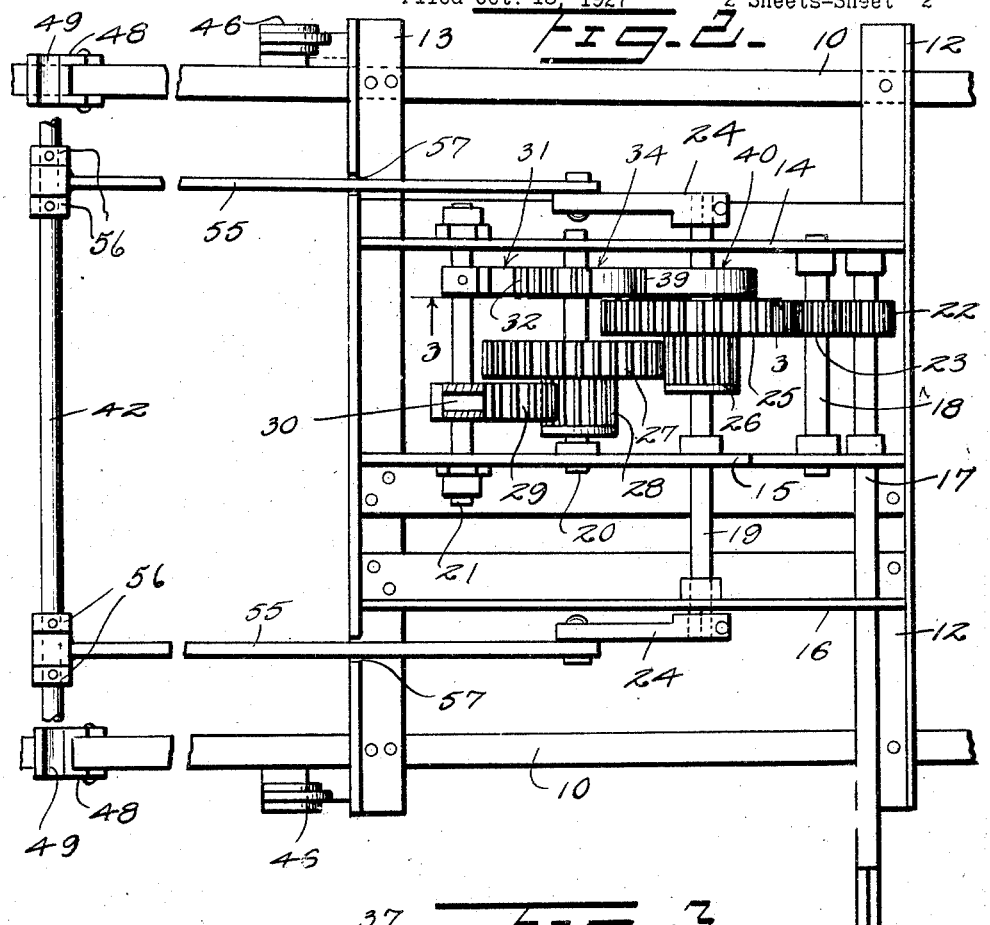
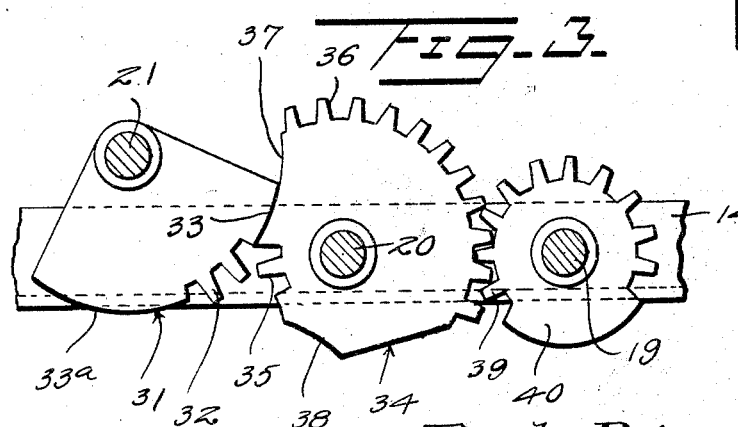
Inventor  
Fred Biszantz  
By Frederick S. Nutt  
Attorney Patented Sept. 4, 1928.

1,682,882

UNITED STATES PATENT OFFICE.

FRED BISZANTZ, OF GALION, OHIO, ASSIGNOR, BY MESNE ASSIGNMENTS, TO THE CENTRAL OHIO STEEL PRODUCTS COMPANY, OF GALION, OHIO, A CORPORATION OF OHIO.

DUMPING BODY.

Application filed October 18, 1927. Serial No. 226,989.

This invention relates to dumping bodies and more particularly to the construction of a dumping body for motor trucks and the like, of such character that the body is tilted and during the tilting operation is forced longitudinally, so that it may be extended well beyond the rear end of the chassis frame to deposit its load and at the same time it will not have abnormal projection during its movements from place to place.

A more specific object of the invention is to produce a device of this character including gearing operating a means for tilting the body and a means for longitudinally shifting the body, the connection between the tilting and shifting means with the gearing being such that the tilting means is continuously operated while the shifting means is intermittent in its operation, being at first inoperative to permit the body to be tilted to a position where it clears all obstructions, then operating to shift the body longitudinally to a proper dumping position and then again becomes inactive to permit the completion of the tilting movement.

A still further object of the invention is to provide a construction such that during transportation, the body is very firmly locked in position and held against vibration.

A still further object of the invention is to provide a device of this character which may be readily and cheaply constructed, which will be durable and efficient in service and a general improvement in the art.

These and other objects I attain by the construction shown in the accompanying drawings, wherein for the purpose of illustration is shown a preferred embodiment of my invention and wherein:—

Figure 1 is a vertical sectional view through a dumping body constructed in accordance with my invention illustrating the body in the dumping position in solid lines and in the loading and transporting position in dotted lines;

Figure 2 is a horizontal sectional view showing the operating mechanism in plan;

Figure 3 is an enlarged section on the line 3—3 of Figure 2;

Figure 4 is an enlarged section showing the latch mechanism for retaining the body in loading position.

Referring now more particularly to the drawings, the dumping body includes a sub frame having longitudinally extending side members 10 for attachment to the chassis frame of a vehicle. These side frames are connected forwardly by a transversely extending channel 11 which provides a bumper or seat for the body when in loading and transporting position, as will hereinafter become apparent. Longitudinally spaced transversely extending front and rear supports 12 and 13 connect the side members 10 adjacent the center thereof and provide a support for transversely spaced longitudinally extending operating mechanism supports 14, 15 and 16. The transversely extending supports 12, 13 are preferably in the form of angle bars having horizontally disposed flanges abutting and secured to the side members 10 and the mechanism supports 14, 15 and 16 are preferably likewise angle bars having the flanges thereof bolted to the flanges of the supports 12 and 13.

Mounted in the supports 14 and 15 are five shafts 17, 18, 19, 20 and 21. The shaft 17 likewise extends through the support 16 and has an end thereof adapted for engagement with a crank whereby it may be rotated. Secured to this shaft is a pinion 22, which meshes with an idler pinion 23 mounted upon the shaft 18. The shaft 19 is likewise extended to pass through the mechanism support 16 and immediately outwardly of the supports 14 and 16 has secured thereto arms 24. Rotatably mounted upon the shaft is a gear and pinion unit, of which the gear 25 meshes with the pinion 23 of the shaft 18 and the pinion 26 meshes with the gear 27 of a similar unit mounted upon the shaft 20. The pinion 28 of this unit meshes with a segment gear 29 having rigidly secured thereto a thrust arm 30. This segment gear 29 is rigidly secured to the shaft 21.

Likewise secured to the shaft 21 is a sector toothed segment 31 having teeth 32 arranged between short and long blank faces 33 and 33ª. Mounted upon the shaft 20 is a mutilated gear 34 having teeth 35 for coacting with the teeth 32 of the gear 31 and a second set of teeth 36, the purpose of which will presently appear.

Between the teeth 35 and 36, re-entrantly curved faces 37 and 38 are provided for coaction with the curved faces 33 and 33ª of the segment 31. The teeth 36 mesh with the teeth 39 of a mutilated gear 40. The gear 40 is fixed to the shaft 19, and it will be seen that as the shaft 21 is rotated to move the thrust arm 30 from a substantially horizontal to a substantially vertical position, the intermittent gearing provided by the elements 31, 34 and 40 permits first a rise of the thrust arm unaccompanied by any movement of the shaft 19, as during this interval, the faces 33 and 37 of the elements 31 and 34 are in engagement. With this primary elevating movement of the arm completed, the teeth 32 and 35 of the elements 31 and 34 come into engagement, with the result that a further rise of the arm is accompanied by a rotation of the shaft 19. Rotation of the shaft 19 is sufficient to cause movement thereof through an angle slightly greater than 180°. When the thrust arm 30 is horizontally disposed and before operation of the mutilated gearing, the arms 24 are forwardly and downwardly inclined and when the movement of the mutilated gearing has been completed, these arms are rearwardly and downwardly inclined. Operation of the mutilated gearing is completed prior to the time that the thrust arm reaches its vertical position and subsequent movements of the thrust arm and of the shaft 21 have no effect upon the position of the mutilated gearing, as during this time, the faces 33ª and 38 of the elements 31 and 34 are in engagement. While reference is made to horizontal and vertical positions of the arm 30, it will be understood that this reference is made solely to differentiate the positions of this arm when the body is in loading or transporting position, and when the body is in dumping position, and that these positions need not be either actually horizontal or actually vertical. Attention is directed to the fact that engagement of the faces 33 and 37 or 33ª and 38 serves to lock the mutilated gear 34 against rotation and maintain the same in proper position for engagement of the gear teeth 32 and 35. This locking also serves to maintain the arms 24 against movement in either their forwardly and downwardly inclined or forwardly and rearwardly inclined positions.

A body 41 is provided having secured thereto a transversely extending shaft 42. This body has further secured thereto adjacent each side thereof and slightly in advance of the shaft 42, bearings 43 mounting rollers 44 spaced similarly to the side members 10 and having channels 45 in their faces to receive these side members and roll thereon as tracks. The side members 10 have secured thereto, immediately rearwardly of the cross member 13, members 46 having at their upper ends hooked terminals which extend rearwardly and are spaced above the members 10 a distance such that as the rollers 44 move forwardly thereover, their hubs or a portion of the bearings 43 thereof engage beneath these hooked portions, so that forward movement of the body and vertical movement thereof at the rollers is prevented. Rearwardly of the members 46, the side members 10 have secured thereto fittings 48 having transversely extending grooves 49 adapted to receive the shaft 42 adjacent the ends thereof.

Secured to the body adjacent the forward end thereof and extending longitudinally of the center of the body are opposed channel members 50 spaced sufficiently to admit the end of the thrust bar 30 and receiving in the channels thereof rollers 51 carried by the ends of this thrust bar. At its forward extremity, the body has a latch element 52 engaging with a coacting latch element 53 carried by the front cross member 11. The latch 53 is spring-pressed and automatically engages when the body comes to loading position and may be disengaged through a cam lever 54. The shaft 42 has engaged therewith the rear ends of connecting rods 55, the forward ends of which are pivotally connected with the free ends of the arms 24. The connection of the rods 55 with the shaft is held against longitudinal movement by suitable collars 56 and connecting rods 55, when the arms 24 are in their rearwardly and downwardly inclined positions, extend into slots 57 formed in the support 13.

The operation of my invention is as follows:—

Assuming the body and sub frame to be mounted upon a suitable vehicle and the body to be in the loading and transporting pisition with the latch 53 engaged, this latch is first disengaged and shaft 17 rotated. Rotation of the shaft 17 through the gearing 22, 23, 25, 26, 27, 28 and 29 cases rotation of the shaft 21 and oscillation of the thrust arm 30. Movement of the thrust arm 30 causes the body 41 to tilt upon the axles of the rollers 44 as bearings, longitudinal movement of the body as a whole being at this time prevented by the fact that the arms 24 are held against rotation by engagement of the faces 33 and 37 of the intermitent gearing elements 31 and 34 and further by the fact that the ends of these arms with which the connecting rods 55 are engaged are so disposed that a plane connecting said ends and the axis of the shaft 42 lies below the axis of the shaft 19 and the ends of the arms are in advance thereof. When the forward end of the body has elevated sufficiently to permit clearance of the latch elements 52 and 53 and of any other obstructions to rearward movement of the body, the teeth 32 and 35 of the elements 31 and 34 come into engagement, with the result that the shaft 19 is rotated, and by its rotation, forces the connecting rods 55 rearwardly. During rearward travel of the body, the rollers 44 operate upon the members 10 and when this travel is limited by termination of the movement of the arms 24 and rods 55, continued movement of the thrust arm will cause a further pivotal movement of the body about the axes of the rollers. This movement causes the shaft 42 to engage in the grooves 49 of the castings 48, which then become the pivots of the body about which the body rotates in response to further movements of the thrust arm.

Attention is directed to the fact that the arms 24 and connecting rods 55 are at this time held against forward movement both by the engagement of the faces 33ª and 38 and by the fact that the connection between the arms and connecting rods lies below a plane connecting the axes of the shafts 19 and 42 and intermediate these shafts. Attention is further directed to the fact that as the arms 55 are held against movement with relation to the shaft 42 and are at this time engaged in slots 57 of the support 13, no transverse movement of the body may take place during the shift from one pivot to another, such as would permit the body to become misaligned with the side members 10 and prevent proper reengagement of the rollers therewith. If desired, the body 41 may be provided with a thrust block 58 which, when the body is in the loading and transporting position, engages against one of the arms 24 to insure against any possible movement of the same to a point where the resistance provided by misalignment of the pivots would be removed to permit rearward movement of the body.

It will be obvious that the use of the pivot blocks 48 merely serves to shift the pivot point of the body rearwardly, so that it will lie more nearly at the center of gravity of the body when the dumping operation has been completed and that, if desired, these extra pivots might be eliminated. It will also be obvious that by providing a construction wherein it is necessary that the body be first tilted to a certain degree before it can be shifted longitudinally, the use of a latch may be resorted to which, without being complicated, will very firmly lock the body against movement. Where the body is capable of initial longitudinal, as well as tilting movement, the latch employed must, of necessity, be more complicated.

Attention is directed to the fact that because of the construction of the guide formed by the channel members 50 and the engagement of the rollers 51 in the channels of this guide, it is impossible for the body to tilt to an excessive degree under the influence of the load which would disturb the connection between the body and thrust bar and necessitate the return of the body by hand. It also enables this thrust bar to exercise an actual pull as well as the thrust in moving the body upon the frame.

Since the construction hereinbefore set forth is capable of a certain range of change and modification without materially departing from the spirit of the invention, I do not limit myself to such specific structure except as hereinafter claimed.

I claim:—

1. In a dumping body assembly, a frame, a body supported from the frame for tilting and longitudinal shifting movements, a shaft mounted upon the frame and having connection with the body whereby the body is tilted as the shaft is rotated, a second shaft mounted upon the frame, means connecting the second shaft and body whereby the body is shifted longitudinally upon rotation of said second shaft, intermittent gearing connecting the first and second shafts and transmitting rotation of the first to the second shaft only after a predetermined rotation of the second shaft and means for rotating the first shaft.

2. In a dumping body assembly, a frame, a body supported from the frame for tilting and longitudinal shifting movements, a shaft mounted upon the frame and having connection with the body whereby the body is tilted as the shaft is rotated, a second shaft mounted upon the frame, means connecting the second shaft and body whereby the body is shifted longitudinally upon rotation of said second shaft, intermittent gearing connecting the first and second shafts and transmitting rotation of the first to the second shaft only after a predetermined rotation of the second shaft and means for rotating the first shaft, said intermittent gearing disconnecting the first and second shafts after a predetermined rotation of the second shaft and prior to completion of rotation of the first shaft.

3. In a dumping body assembly, a frame, a body supported from the frame for tilting and longitudinal shifting movements, a shaft mounted upon the frame and having connection with the body whereby the body is tilted as the shaft is rotated, a second shaft mounted upon the frame, means connecting the second shaft and body whereby the body is shifted longitudinally upon rotation of said second shaft, intermittent gearing connecting the first and second shafts and transmitting rotation of the first to the second shaft only after a predetermined rotation of the second shaft and means for rotating the first shaft, said intermittent gearing when inoperative to transmit motion from the first to the second shafts locking the second shaft against rotation.

4. In a dumping body assembly, a frame, a body supported from the frame for tilting and longitudinal shifting movements, a shaft mounted upon the frame and having connection with the body whereby the body is tilted as the shaft is rotated, a second shaft mounted upon the frame, means connecting the second shaft and body whereby the body is shifted longitudinally upon rotation of said second shaft, intermittent gearing connecting the first and second shafts and transmitting rotation of the first to the second shaft only after a predetermined rotation of the second shaft and means for rotating the first shaft, said intermittent gearing disconnecting the first and second shafts after a predetermined rotation of the second shaft and prior to completion of rotation of the first shaft, said intermittent gearing when inoperative to transmit motion from the first to the second shafts locking the second shaft against rotation.

5. In a dumping body assembly, a frame, a body supported from the frame for tilting and longitudinal shifting movements thereon, a shaft mounted upon the frame for connection with the body whereby the body is tilted as the shaft is rotated, a second shaft mounted upon the frame and having arms, links connecting said arms and the body whereby the body is shifted longitudinally as the second shaft is rotated, intermittent gearing connecting the first and second shafts and inoperative to cause a rotation of the second shaft until the completion of a primary rotating movement of the first shaft during which the body is partially tilted and means for rotating the first shaft.

6. In a dumping body assembly, a frame, a body supported from the frame for tilting and longitudinal shifting movements thereon, a shaft mounted upon the frame for connection with the body whereby the body is tilted as the shaft is rotated, a second shaft mounted upon the frame and having arms, links connecting said arms and the body whereby the body is shifted longitudially as the second shaft is rotated, intermittent gearing connecting the first and second shafts and inoperative to cause a rotation of the second shaft until the completion of a primary rotating movement of the first shaft during which the body is partially tilted and means for rotating the first shaft, said intermittent gearing locking the second shaft against rotation when inoperative.

7. In a dumping body assembly, a frame, a body having rollers engaging the frame, a shaft mounted upon the frame, a connection between the shaft and the body whereby the body is tilted about the axles of the rollers as the shaft is rotated, a second shaft carried by the frame, means connecting said second shaft and the body whereby the body is shifted longitudinally upon the frame, intermittent gearing connecting the first and second shafts and inoperative to transmit rotation of the first to the second shaft during a primary rotating movement of the first shaft and means for rotating the first shaft.

8. In a dumping body assembly, a frame, a body having rollers engaging the frame, a shaft mounted upon the frame, a connection between the shaft and the body whereby the body is tilted about the axles of the rollers as the shaft is rotated, a second shaft carried by the frame, means connecting said second shaft and the body whereby the body is shifted longitudinally upon the frame, intermittent gearing connecting the first and second shafts and inoperative to transmit rotation of the first to the second shaft during a primary rotating movement of the first shaft, means for rotating the first shaft, pivot elements carried by the body rearwardly of said rollers and coacting pivot elements carried by the frame and receiving the pivot elements of the body upon a predetermined tilting movement of the body.

9. In a dumping body assembly, a frame, a body having rollers engaging the frame, a shaft mounted upon the frame, a connection between the shaft and the body whereby the body is tilted about the axles of the rollers as the shaft is rotated, a second shaft carried by the frame, means connecting said second shaft and the body whereby the body is shifted longitudinally upon the frame, intermittent gearing connecting the first and second shafts and inoperative to transmit rotation of the first to the second shaft during a primary rotating movement of the first shaft, means for rotating he first shaft, pivot elements carried by the body rearwardly of said rollers and coacting pivot elements carried by the frame and receiving the pivot elements of the body upon a predetermined tilting movement of the body, said intermittent gearing checking rotation of the second shaft when the pivot elements of the body and frame are aligned.

10. In a dumping body assembly, a frame, a body supported from the frame for tilting and longitudinal shifting movements, a shaft mounted upon the frame having connection with the body whereby the body is tilted as the shaft is rotated, a second shaft mounted upon the frame, means connecting the first and second shafts whereby upon rotation of the first shaft said rotation is transmitted from the first to the second shaft only after a primary rotating movement and such transmission is terminated prior to the completion of the rotating movement of the first shaft, connections between the body and second shaft whereby the body is shifted longitudinally as the second shaft is rotated and means for rotating the first shaft.

11. In a dumping body assembly, a body, a frame, rollers supporting the body at a point intermediate the ends thereof for longitudinal movement and with relation to the frame, means for tilting the body and means for shifting the body longitudinally operated by the tilting means and inoperative during initial and final tilting movements of the body.

12. In a dumping body assembly, a body, a frame, rollers supporting the body at a point intermediate the ends thereof for longitudinal movement and with relation to the frame, means for tilting the body and means for shifting the body longitudinally operated by the tilting means and inoperative during initial and final tilting movements of the body, said shifting means locking the body against longitudinal movement when inoperative.

13. In a dumping body assembly, a frame, a body mounted for tilting and bodily longitudinal movement thereon to permit shifting of the body from dumping to loading or loading to dumping positions, means for tilting the body, means for shifting the body longitudinally, a single operating means having connections with said shifting and tilting means whereby the tilting means is operated continuously to shift the body from one to the other of said positions and the shifting means is operated after a predetermined operation of the tilting means and its operation terminated at a predetermined interval before the completion of the operation of the tilting means whereby said shifting means is inoperative during initial and final tilting movements of the body.

14. In a dumping body assembly, a frame, a body mounted for tilting and bodily longitudinal movement thereon to permit shifting of the body from dumping to loading or loading to dumping positions, means for tilting the body, means for shifting the body longitudinally, a single operating means having connections with said shifting and tilting means whereby the tilting means is operated continuously to shift the body from one to the other of said positions and the shifting means is operated after a predetermined operation of the tilting means and its operation terminated at a predetermined interval before the completion of the operation of the tilting means whereby said shifting means is inoperative during initial and final tilting movements of the body, said shifting means including parts locking the body against longitudinal movement when the shifting means is inoperative.

In testimony whereof I affix my signature.

FRED BISZANTZ.